(12) United States Patent
Kasuya

(10) Patent No.: US 11,838,457 B2
(45) Date of Patent: Dec. 5, 2023

(54) IMAGE PROCESSING APPARATUS, CONTROL METHOD, FOR DIRECTLY REGISTERING IMAGE DATA RECEIVED BY THE IMAGE FORMING APPARATUS AS VOUCHER DATA IN AN EXPENSE PROCESSING SYSTEM WITHOUT PRINTING THE IMAGE DATA

(71) Applicant: CANON KABUSHIKI KAISHA, Tokyo (JP)

(72) Inventor: Kenji Kasuya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/519,134

(22) Filed: Nov. 4, 2021

(65) Prior Publication Data

US 2022/0150367 A1    May 12, 2022

(30) Foreign Application Priority Data

Nov. 12, 2020    (JP) .................................. 2020-188939

(51) Int. Cl.
*H04N 1/00*    (2006.01)
*G06Q 40/12*    (2023.01)

(52) U.S. Cl.
CPC ......... *H04N 1/00212* (2013.01); *G06Q 40/12* (2013.12); *H04N 1/00411* (2013.01); *H04N 1/00514* (2013.01)

(58) Field of Classification Search
CPC ........... H04N 1/00206; H04N 1/00209; H04N 1/00212; H04N 1/00214; H04N 1/32101; H04N 1/32128; H04N 1/32133; H04N 1/32144; H04N 1/00331; H04N 2201/3226; H04N 1/00244; H04N 1/32406; H04N 1/32411
USPC ....................................................... 358/402
See application file for complete search history.

(56) References Cited

U.S. PATENT DOCUMENTS

| | | | |
|---|---|---|---|
| 6,831,758 B1 * | 12/2004 | Toda ................... | H04N 1/32769 358/440 |
| 2008/0301234 A1 * | 12/2008 | Tonegawa ............. | H04L 51/066 709/206 |
| 2014/0093170 A1 * | 4/2014 | Ohguro ................ | G06V 30/416 382/176 |

(Continued)

FOREIGN PATENT DOCUMENTS

JP    2019124981 A    7/2019

*Primary Examiner* — Kent Yip
(74) *Attorney, Agent, or Firm* — CANON U.S.A., INC. IP Division

(57) ABSTRACT

An image processing apparatus is provided and is capable of directly registering image data received by the image forming apparatus in an expense processing system as voucher data without printing the image data. The image processing apparatus according to the present invention is an image processing apparatus capable of communicating with an expense processing server that registers a character string included in received image data as expense data. The image processing apparatus includes a reception unit configured to receive image data from an external apparatus and a transmission unit configured to automatically transmit the image data received by the reception unit to the expense processing server.

11 Claims, 16 Drawing Sheets

(56) References Cited

U.S. PATENT DOCUMENTS

2015/0304520 A1* 10/2015 Nakamura ......... H04N 1/00411
                                                                358/403

* cited by examiner

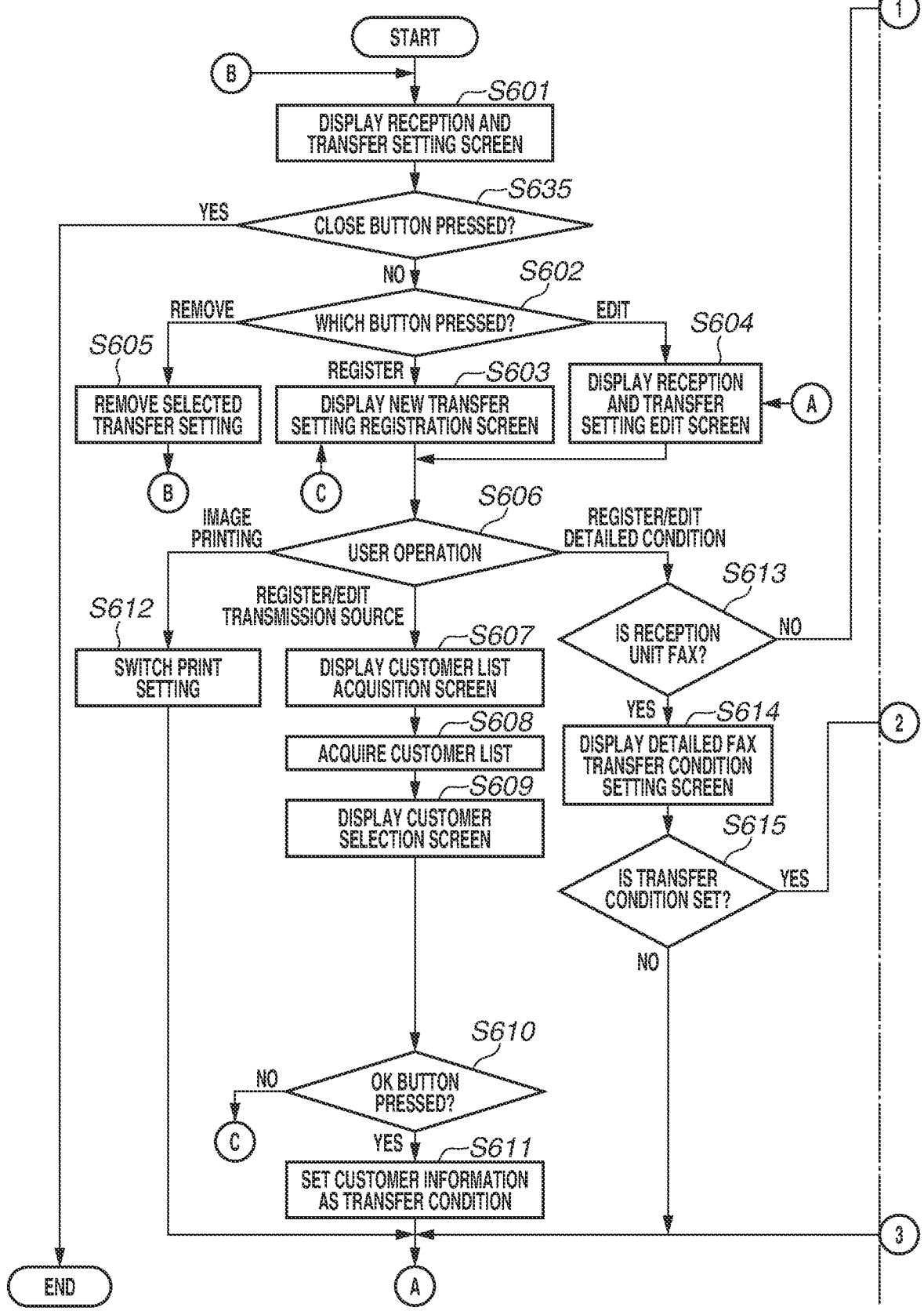

FIG.7

RECEPTION AND TRANSFER SETTING ABOUT EXPENSE PROCESSING SERVICE 704

| NO | NAMES | RECEPTION UNIT | TRANSMISSION SOURCE NUMBER/ MAIL ADDRESS | TRANSFER CONDITION | IMAGE PRINTING |
|----|-------|----------------|------------------------------------------|--------------------|----------------|
| 1  | COMPANY A (FAX) | FAX | 0351069270 | PAGE SPECIFICATION PAGE 2 | YES |
| 2  | COMPANY A (I-FAX) | I-FAX | money@a-company.com | KEYWORD IN TEXT BILL | NO |
| 3  | COMPANY B | FAX | 0454023318 | AUTOMATIC KEYWORD EXTRACTION BILL | YES |

701 REGISTER    702 EDIT    703 REMOVE    705 CLOSE

FIG.10

| SELECT TRANSFER TARGET TRANSMISSION SOURCE FROM THE LIST OF CUSTOMERS | | |
|---|---|---|
| NAMES | CONTACT INFORMATION | TELEPHONE NUMBER/MAIL ADDRESS |
| COMPANY A (FAX) | FAX | 0351069270 |
| COMPANY A (I-FAX) | I-FAX | money@a-company.com |
| COMPANY B (FAX) | FAX | 0454023318 |
| COMPANY B (I-FAX) | I-FAX | salesdev@b-company.com |
| COMPANY C (FAX) | FAX | 0655094712 |
| COMPANY C (I-FAX) | I-FAX | maido@c-company.com |

CANCEL  1002

RECEPTION AND TRANSFER SETTING ABOUT EXPENSE PROCESSING SERVICE

| | | |
|---|---|---|
| NAMES: | COMPANY A (FAX) | |
| RECEPTION UNIT: | FAX | REGISTER/EDIT TRANSMISSION SOURCE |
| TRANSMISSION SOURCE NUMBER: TRANSMISSION SOURCE MAIL ADDRESS: | 0351069270 | 801 |
| TRANSFER CONDITION: | NOT SET | REGISTER/EDIT DETAILED CONDITION |
| IMAGE PRINTING: | YES  NO | 802 |
| | 803 | |
| CANCEL | | OK |

IMAGE PROCESSING APPARATUS, CONTROL METHOD, FOR DIRECTLY REGISTERING IMAGE DATA RECEIVED BY THE IMAGE FORMING APPARATUS AS VOUCHER DATA IN AN EXPENSE PROCESSING SYSTEM WITHOUT PRINTING THE IMAGE DATA

BACKGROUND

Field

The present disclosure relates to an image processing apparatus, a control method thereof, and a storage medium.

Description of the Related Art

There is known a service in which an image file generated by causing an image forming apparatus to scan a voucher, such as a receipt, is registered in an external expense processing system (Japanese Patent Application Laid-Open No. 2019-124981).

The above conventional technique assumes registering an image file generated by causing an image forming apparatus to scan information as voucher data in an expense processing system (an expense processing server). Thus, since users cannot directly use the image forming apparatus in various situations, the users cannot use the system in these situations. In one example, a user cannot use the image forming apparatus from a location other than his or her office where the image forming apparatus is located. In another example, a user cannot use the image forming apparatus at night or on his or her day off. That is, the above conventional technique is not convenient. In addition, there is a case where the image forming apparatus receives a voucher image by facsimile (fax) or Internet fax, instead of the original of a voucher, such as a receipt, and registers this voucher image in the expense processing system. In this case, after the image forming apparatus prints out the received image, a scanner of the image forming apparatus needs to scan the printed image again.

SUMMARY OF THE INVENTION

The present disclosure has been made in view of the above issue and is directed to providing an image processing apparatus capable of directly registering image data received by the image forming apparatus as voucher data in an expense processing system without printing the image data.

An image processing apparatus according to the present disclosure is capable of communicating with an expense processing server that registers a character string included in received image data as expense data, the image processing apparatus including a reception unit configured to receive image data from an external apparatus and a transmission unit configured to automatically transmit the image data received by the reception unit to the expense processing server.

The present disclosure enables registering an image received by an image forming apparatus as voucher data in an expense processing system without printing and scanning the image again.

Further features of the present disclosure will become apparent from the following description of exemplary embodiments with reference to the attached drawings.

BRIEF DESCRIPTION OF THE DRAWINGS

FIGS. 6A and 6B are a flowchart illustrating a procedure of creating an expense processing system transfer list in the image forming apparatus.

FIG. 7 illustrates a reception and transfer setting screen of the image forming apparatus in the cooperation system.

FIG. 10 illustrates a customer selection screen of the image forming apparatus in the cooperation system.

FIG. 11 illustrates a reception and transfer setting edit screen of the image forming apparatus in the cooperation system.

DESCRIPTION OF THE EMBODIMENTS

Hereinafter, exemplary embodiments of the present disclosure will be described in detail with reference to drawings. The following exemplary embodiments do not limit the present invention described in the scope of the claims. In addition, all the combinations of features described in the exemplary embodiments are not necessarily essential as the means of the disclosure to solve the above issue.

Figure 1:
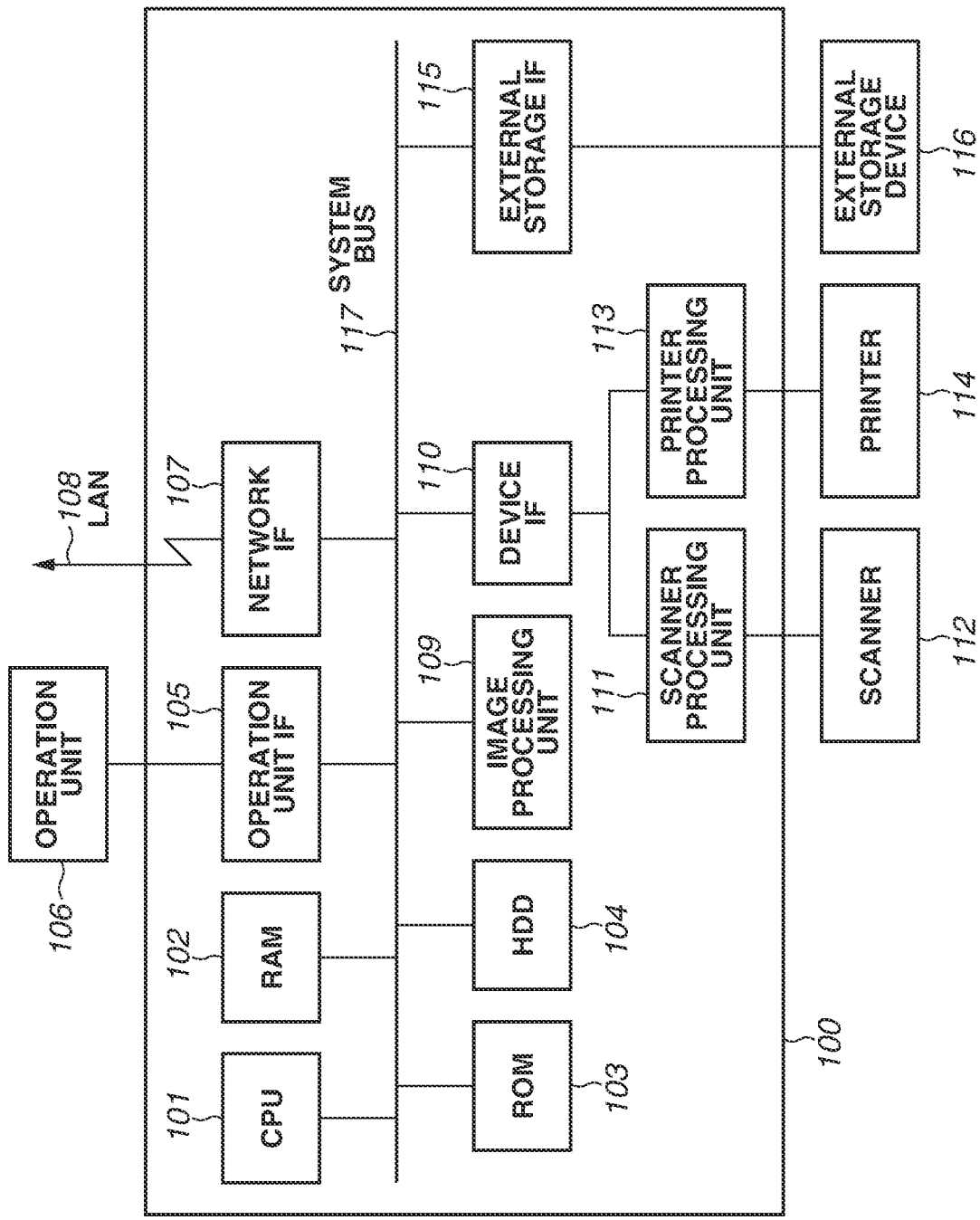
FIG. 1 illustrates a hardware configuration of an image forming apparatus.

FIG. 1 is a block diagram illustrating a hardware configuration of an image forming apparatus 1. According to the present exemplary embodiment, as illustrated in FIG. 1, the image forming apparatus 1 is realized, for example, as a so-called multifunctional peripheral (MFP) in which a plurality of functions including a scan function and a print function are integrated. The image forming apparatus 1 includes a controller unit 100 that comprehensively controls the image forming apparatus 1, an operation unit 106, a scanner 112, and a printer 114. The operation unit 106 includes a numeric keypad, various kinds of hardware keys, etc. for receiving input of user instructions such as for execution of jobs. In addition, the operation unit 106 includes a display panel for displaying, to the user, apparatus information, job progress information, etc. The display panel also displays a screen on which functions executable by the image forming apparatus 1 are set. The scanner 112 is an image input device that optically reads an image on a set document. The printer 114 is an image output device that prints out an image on a recording medium, such as printing paper, based on image data.

The operation unit 106 is connected to an operation unit interface (I/F) 105 included in the controller unit 100. The scanner 112 and the printer 114 are connected to a scanner processing unit 111 and a printer processing unit 113, respectively, included in the controller unit 100. With this configuration, the operation unit 106, the scanner 112, the printer 114 are controlled and operated by the controller unit 100.

As needed, an external storage device 116, such as universal serial bus (USB) memory media, may be connected to the image forming apparatus 1. In this case, the external storage device 116 is connected to a system bus 117 via an external storage I/F 115 and is controlled and operated by the controller unit 100.

The controller unit 100 includes a central processing unit (CPU) 101 that comprehensively controls the individual blocks in the controller unit 100. The CPU 101 is connected to a random access memory (RAM) 102, a read-only memory (ROM) 103, a hard disk drive (HDD) 104, the operation unit I/F 105, a network I/F 107, a facsimile (fax) I/F (not illustrated), an image processing unit 109, a device IF 110, and the external storage I/F 115 via the system bus 117. The RAM 102 is a general-purpose RAM, i.e., a memory for providing the CPU 101 with a work area. In addition, the RAM 102 is used as a memory for temporarily holding parameters, setting values, etc. and as an image memory for holding image data per predetermined unit such as per page. The ROM 103 is a general-purpose ROM and holds a system boot program as a boot ROM, for example. The HDD 104 holds a system software program, history data, tables, etc. Functions of the image forming apparatus 1 are realized, for example, by causing the CPU 101 to read out a program stored in the ROM 103 to the RAM 102 and to execute the read program.

The operation unit I/F 105 is an interface for exchanging information with the operation unit 106. The operation unit I/F 105 outputs display data to the operation unit 106 in accordance with an instruction from the CPU 101 and transfers information input by the user on the operation unit 106 to the CPU 101.

The network I/F 107 is connected to a wired or wireless local area network (LAN) 108 and enables exchange of information between the image forming apparatus 1 and equipment on the LAN 108. The network I/F 107 has a configuration compatible with the LAN 108. For example, the network I/F 107 may have a configuration compatible with near-field communication in which the wireless distance is few tens of centimeters. In this case, the image forming apparatus 1 performs mutual communication with a portable wireless terminal.

The image processing unit 109 executes general image processing. For example, the image processing unit 109 enlarges, reduces, rotates, and converts image data acquired from the outside via the LAN 108. In addition, the image processing unit 109 rasterizes a page description language (PDL) code received via the LAN 108 to a bitmap image. In addition, when an image is output by the printer 114 via the printer processing unit 113, the image processing unit 109 performs processing for converting compressed and coded image data stored in the RAM 102 into a format that can be processed by the printer processing unit 113.

The device I/F 110 is connected to the scanner 112 and the printer 114 via the scanner processing unit 113 and the printer processing unit 113. The device I/F 110 performs synchronous/asynchronous conversion of image data and transfers setting values, adjustment values, etc. In addition, the device I/F 110 transfers state information about the scanner 112 and the printer 114 to the CPU 101. For example, the state information includes error information. e.g., a jam that has occurred in the scanner 112 or the printer 114.

The scanner processing unit 113 performs various kinds of processing corresponding to scan functions on the read data read and input by the scanner 112. For example, the scanner processing unit 113 corrects and processes the read data, separates the image area of the read data, changes the magnification of the read data, and binarizes the read data. The scanner 112 includes an automatic and continuous document feeding device and a reading pressure plate device not illustrated. The scanner 112 is capable of, for example, reading a document placed on a document glass platform and performing double-sided reading on a plurality of documents. In addition, the scanner 112 includes sensors for detecting the opening and closing of the cover of the feeding device not illustrated and the opening and closing of the document cover not illustrated. The scanner 112 also includes sensors for detecting presence or absence of a document and a document size. The detected signals of these sensors and the state information about the scanner 112 are transmitted to the CPU 101 via the scanner processing unit 113 and the device I/F 110. The CPU 101 consequently recognizes the state of the scanner 112, such as occurrence and elimination of an error in the scanner 112.

The printer processing unit 113 performs, on the image data to be printed, processing corresponding to print functions such as output correction, resolution conversion, and adjustment of the print position of the image, based on the output characteristics of the printer 114. The printer 114 includes at least one feeding cassette (not illustrated) that holds printing paper, at least one toner tray (not illustrated) that holds toner, a feeding unit (not illustrated) that can sequentially feed sheets one by one from a feeding cassette, a marking unit (not illustrated) that applies toner to a fed sheet, and a fixing unit (not illustrated) that fixes the toner applied by the marking unit by heat and pressure. For example, the printer 114 includes sensors for detecting the opening and closing status and the number of remaining sheets of the individual feeding cassette, the opening and closing status of the toner tray, and the opening and closing of the cover of the feeding unit not illustrated. For example, the printer 114 also includes sensors for detecting the presence or absence of toner and the location of the sheet being fed. The detected signals from these sensors and the state information about the printer 114 are transmitted to the CPU 101 via the printer processing unit 113 and the device I/F 110. The CPU 101 consequently recognizes the state of the printer 114, such as occurrence and elimination of an error in the printer 114.

When the external storage I/F 115 is connected to the external storage device 116, the external storage I/F 115 reads data stored in the external storage device 116 or writes data in the external storage device 116 in accordance with an instruction from the CPU 101.

Figure 2:
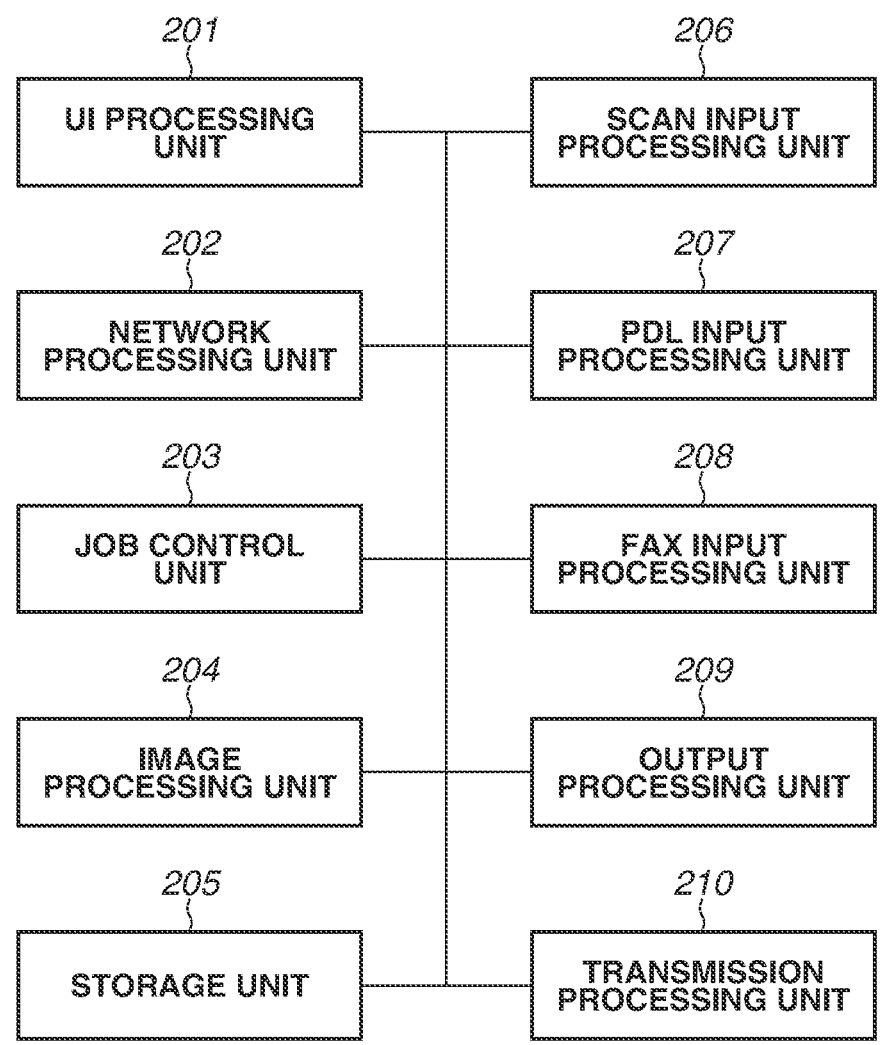
FIG. 2 illustrates a software module configuration of the image forming apparatus.

FIG. 2 illustrates a software module configuration of the image forming apparatus 1. The individual module in FIG. 2 is realized by causing the CPU 101 to execute a program.

A user interface (UI) processing unit 201 performs processing relating to the operation unit I/F 105 and the operation unit 106. When the user operates the operation unit 106, as needed, the UI processing unit 201 notifies a different module of this user operation and displays a screen on the operation unit 106 in accordance with an instruction from the different module. In addition, for example, the UI processing unit 201 edits rendering data to be displayed on the operation unit 106.

A network processing unit 202 communicates with equipment on the LAN 108 via the network I/F 107. When the network processing unit 202 receives a control command or data from equipment on the LAN 108, the network processing unit 202 notifies a different module of the information. In addition, the network processing unit 202 transmits a control command or data to equipment on the LAN 108 in accordance with an instruction from the different module.

A job control unit 203 controls the other modules and comprehensively controls execution of various jobs that occur in the image forming apparatus 1, such as copy, print, and fax jobs. When a job is given from the UI processing unit 201 or the network processing unit 202, the job control unit 203 determines the kind of the job and instructs an input processing unit suitable for the kind of the job to perform processing for generating an image to be printed. For example, when a copy job is given, the job control unit 203 outputs an instruction for executing the copy job to a scan input processing unit 206. When a PDL is given, the job control unit 203 outputs an instruction for executing the PDL to a PDL input processing unit 207. After the individual input processing unit generates an image per page and stores the image in a storage unit 205, the individual input processing unit notifies the job control unit 203 of this operation. When notified of the operation, the job control unit 203 instructs an output processing unit 209 to print the image on a recording medium. The image forming apparatus 1 realizes image printing by repeating the series of control processes for the number of pages of the job.

An image processing unit 204 performs processing relating to the image processing unit 109. In accordance with an instruction from an input processing unit or the output processing unit 209, the image processing unit 204 performs software-based image processing or hardware-based image processing using the image processing unit 109. In addition, the image processing unit 204 performs voucher image division and handwriting determination The storage unit 205 reads and writes data on the RAM 102 or the HDD 104. In accordance with instructions from different modules, the storage unit 205 sets jobs and stores image data therein.

In accordance with an instruction from the job control unit 203, the scan input processing unit 206 controls the scanner processing unit 111 and the scanner 112 to read a document set on the scanner 112. The scan input processing unit 206 controls the scanner processing unit 111 to perform image processing on the read image data. In addition, the scan input processing unit 206 acquires the state information about the scanner processing unit 111 and the scanner 112 and notifies the job control unit 203 of the acquired state information. In addition, when the scan input processing unit 206 receives an interrupt instruction from the job control unit 203, the scan input processing unit 206 can interrupt the document reading processing and the image generation processing.

In accordance with an instruction from the job control unit 203, the PDL input processing unit 207 analyzes the PDL data received via the network processing unit 202 and rasterizes the PDL data to a bitmap image per page. The rasterized bitmap image is stored in a storage area by the storage unit 205. In addition, when the PDL input processing unit 207 receives an interrupt instruction from the job control unit 203, the PDL input processing unit 207 can interrupt the PDL analysis processing and the image generation processing.

In accordance with an instruction from the job control unit 203, a fax input processing unit 208 converts the data received via the network processing unit 202 into a binary image per page. The obtained binary image is stored in a storage area by the storage unit 205.

In accordance with an instruction from the job control unit 203, the output processing unit 209 controls the image processing unit 204, the printer processing unit 113, and the printer 114, to perform image processing suitable for image data generated by an individual input processing unit and print the resultant image data on a recording medium. In addition, the output processing unit 209 acquires the state information about the printer processing unit 113 and the printer 114 and notifies the job control unit 203 of the state information. While the output processing unit 209 is performing print processing of one job, the output processing unit 209 does not perform print processing of another job. However, the output processing unit 209 may interrupt the processing of the job being printed and start processing on another job only when the output processing unit 209 receives a priority update notification from the job control unit 203.

In accordance with an instruction from the job control unit 203, a transmission processing unit 210 controls the image processing unit 204 and the network processing unit 202 to transmit an image to equipment on the LAN 108.

Figure 3:
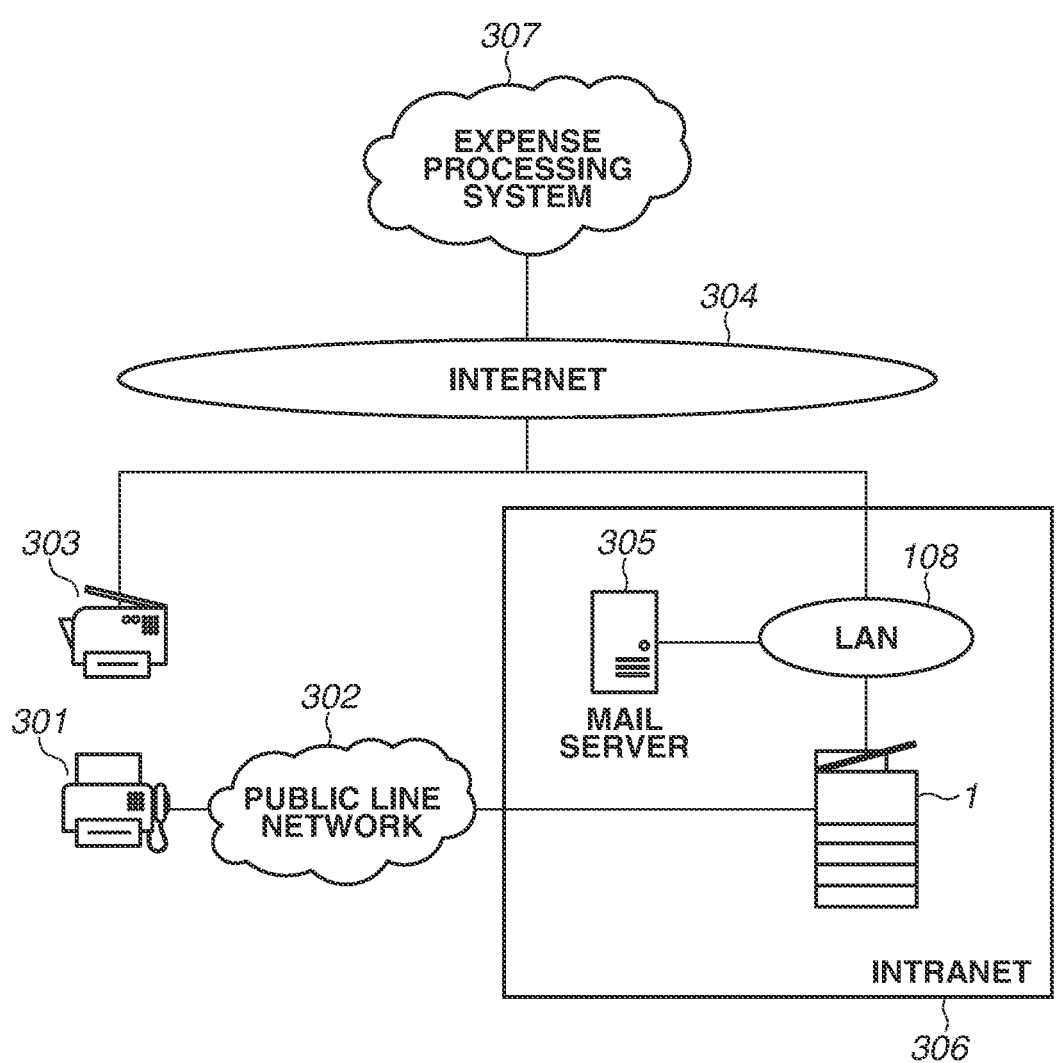
FIG. 3 illustrates an overall configuration of a cooperation system.

FIG. 3 illustrates an overall configuration of a cooperation system according to the present exemplary embodiment. The image forming apparatus 1 is installed in an intranet 306 and is connected to an expense processing system (expense processing server) 307 via the LAN 108 and an Internet 304. In addition, the image forming apparatus 1 is connected to a public line network 302 and receives a facsimile image transmitted from an external fax 301. The image forming apparatus 1 is also connected to a mail server 305 via the LAN 108 and receives an Internet fax (Ifax) or electronic mail transmitted from an external Internet fax 303 or the like and delivered to the mail server 305. Based on a received fax image or Internet fax image, the image forming apparatus 1 requests the expense processing system 307 to perform registration of an expense by using a voucher image. In the expense processing system 307, when image data is registered as a voucher, for example, the amount of money is automatically read by optical character recognition (OCR) and is registered as additional information. The image data attached to the mail is also registered in the expense processing system 307.

Figure 4:
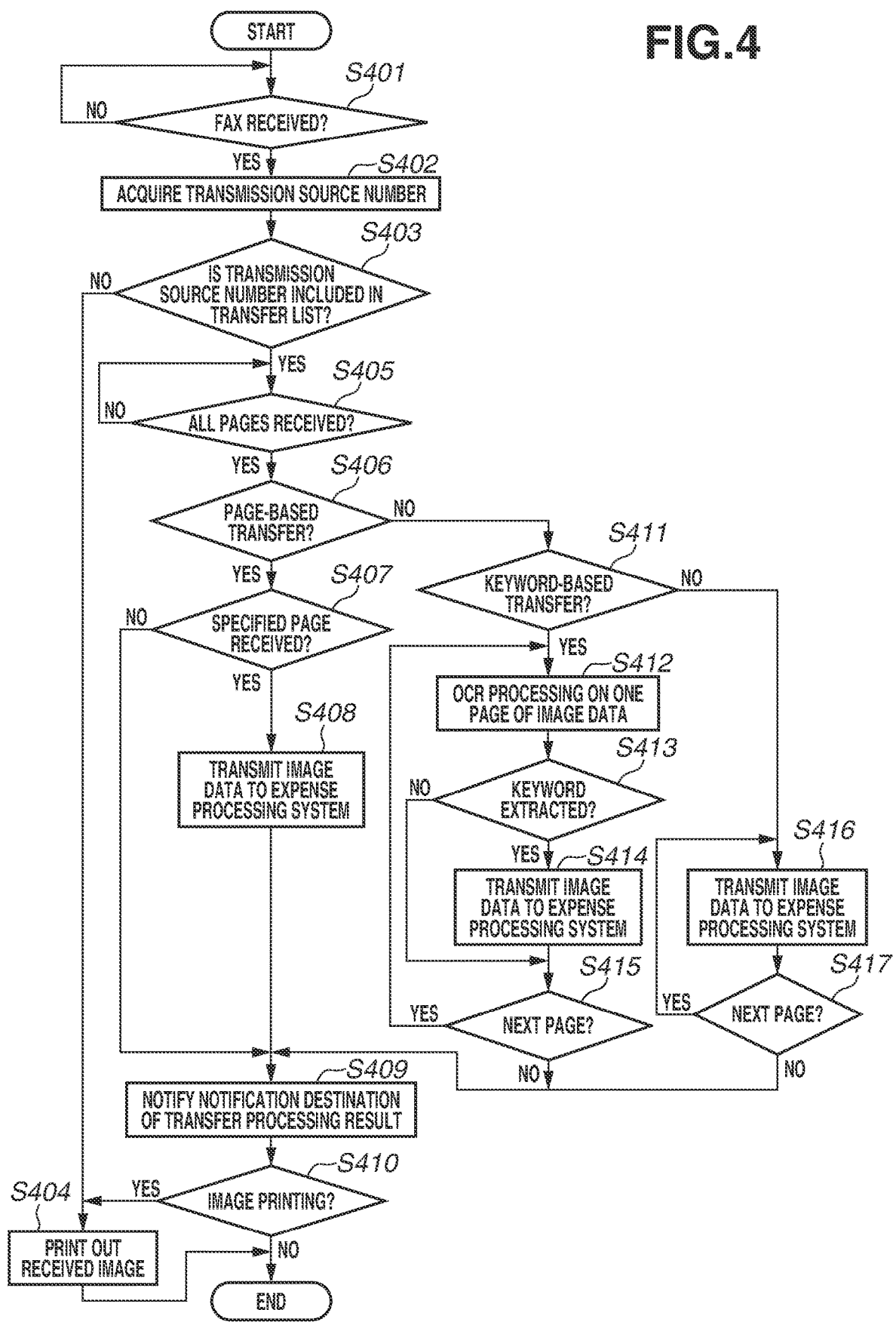
FIG. 4 is a flowchart illustrating processing performed when the image forming apparatus transfers an image received by facsimile (fax) and registers an expense as a voucher.

FIG. 4 is a flowchart illustrating processing performed when the image forming apparatus 1 registers an expense as a voucher by automatically transferring fax image data received thereby, to the expense processing system 307. For example, the processing in the flowchart is realized by causing the CPU 101 to read out a program stored in the HDD 104 to the RAM 102 and execute the read program. The processing in the other flowcharts illustrated in the following drawings is also performed by the CPU 101.

First, in step S401, the CPU 101 determines whether the image forming apparatus 1 has received a fax. If the CPU 101 determines that the image forming apparatus 1 has received a fax (YES in step S401), the processing proceeds to step S402.

In step S402, the CPU 101 acquires a transmission source number given from the transmission source fax via the FAX communication protocol.

In step S403, the CPU 101 determines whether the transmission source number acquired in step S402 is included in a preset expense processing system transfer list. The expense processing system transfer list is a list created by a user operation by using customer information acquired by the image forming apparatus 1 and managed on the expense processing system 307. In the present system, the expense processing system transfer list is used to determine whether the received image needs to be transferred to and registered in the expense processing system 307. Details of the expense processing system transfer list will be described below with reference to FIGS. 6A to 14. If the CPU 101 determines that the transmission source number is included in the expense processing system transfer list (YES in step S403), the processing proceeds to step S405. Otherwise (NO in step S403), the processing proceeds to step S404.

In step S404, the CPU 101 prints out the received image and ends the present processing. If the image forming apparatus 1 has received a plurality of pages, the CPU 101 prints out all the pages.

In step S405, the CPU 101 determines whether the image forming apparatus 1 has received all the pages of the fax transmission. If the CPU 101 determines that the image forming apparatus 1 has received all the pages of the fax transmission (YES in step S405), the processing proceeds to step S406.

In step S406, the CPU 101 determines whether page-based transfer is set as a detailed transfer condition with respect to the expense processing system 307. In a case where the page-based transfer is set, only the page or pages specified by the user, of all the received pages are transferred to the expense processing system 307. If the CPU 101 determines that the page-based transfer is set (YES in step S406), the processing proceeds to step S407. Otherwise (NO in step S406), the processing proceeds to step S411.

In step S407, the CPU 101 determines whether the image forming apparatus 1 has received the page corresponding to the page number set by the user as the page to be transferred based on the page-based transfer. If the CPU 101 determines that the image forming apparatus 1 has received the specified page (YES in step S407), the processing proceeds to step S408. Otherwise (NO in step S407), the processing proceeds to step S409.

In step S408, the CPU 101 transmits one page of the image data to the expense processing system 307 and requests the expense processing system 307 to register the image data as expense data.

In step S409, the CPU 101 notifies a preset notification destination of the result of the transfer to the expense processing system 307.

In step S410, the CPU 101 determines whether image printing is set as a currently applied transfer condition. If the image printing is set (YES in step S410), the processing proceeds to step S404, and the CPU 101 prints out the received image and ends the present processing. If the image printing is not set (NO in step S410), the CPU 101 ends the processing without printing out the received image.

In step S411, the CPU 101 determines whether keyword-based transfer is set as a detailed transfer condition with respect to the expense processing system 307. If the CPU 101 determines that the keyword-based transfer is specified (YES in step S411), the processing proceeds to step S412. Otherwise (NO in step S411), the processing proceeds to step S416.

In step S412, the CPU 101 performs OCR (character recognition processing) on one page of the image data.

In step S413, the CPU 101 determines whether the keyword set as a detailed transfer condition has been extracted from the result of the OCR processing performed in step S412. If the CPU 101 determines that the keyword has been extracted (YES in step S413), the processing proceeds to step S414. Otherwise (NO in step S413), the processing proceeds to step S415.

In step S414, the CPU 101 transmits the image data of the page, from which the keyword has been extracted, to the expense processing system 307 and requests the expense processing system 307 to register the image data as expense data.

In step S415, the CPU 101 determines whether the received image data has the next page. If the CPU 101 determines that the received image data has the next page (YES in step S415), the processing returns to step S412, and the CPU 101 performs steps S412 to S414 again. Otherwise (NO in step S415), the processing proceeds to step S409.

In step S416, the CPU 101 transmits one page of the image data to the expense processing system 307 and requests the expense processing system 307 to register the image data as expense data.

In step S417, the CPU 101 determines whether the received image data has the next page. If the CPU 101 determines that the received image data has the next page (YES in step S417), the processing returns to step S416, and the CPU 101 processes the next page of image data in the same way as described above. If the CPU 101 determines that the received image data does not have the next page (NO in step S417), the processing proceeds to step S409.

Figure 5A:
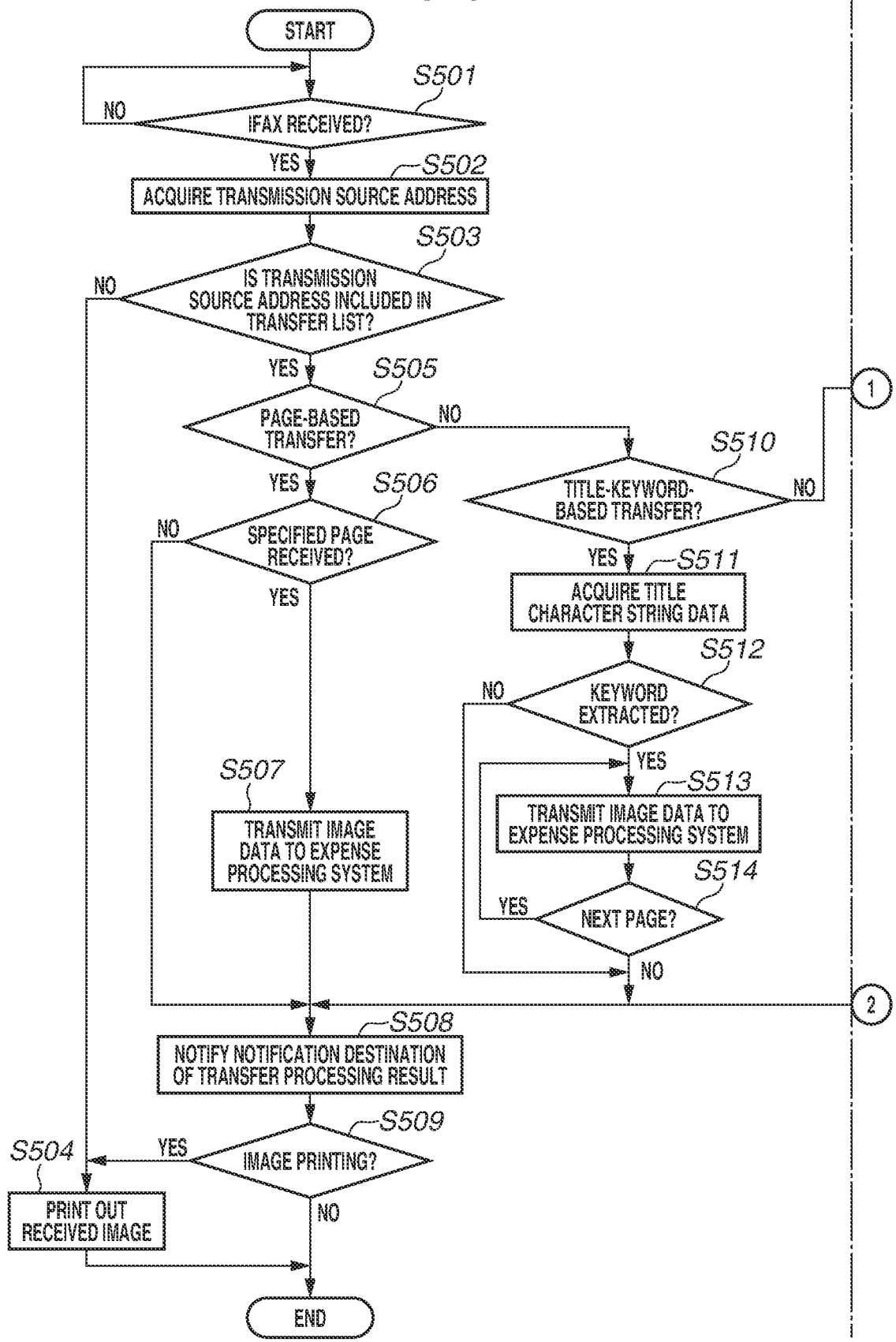
FIGS. 5A and 5B are a flowchart illustrating processing performed when the image forming apparatus transfers an image received by Internet fax (Ifax) and registers an expense as a voucher.
Figure 5B:
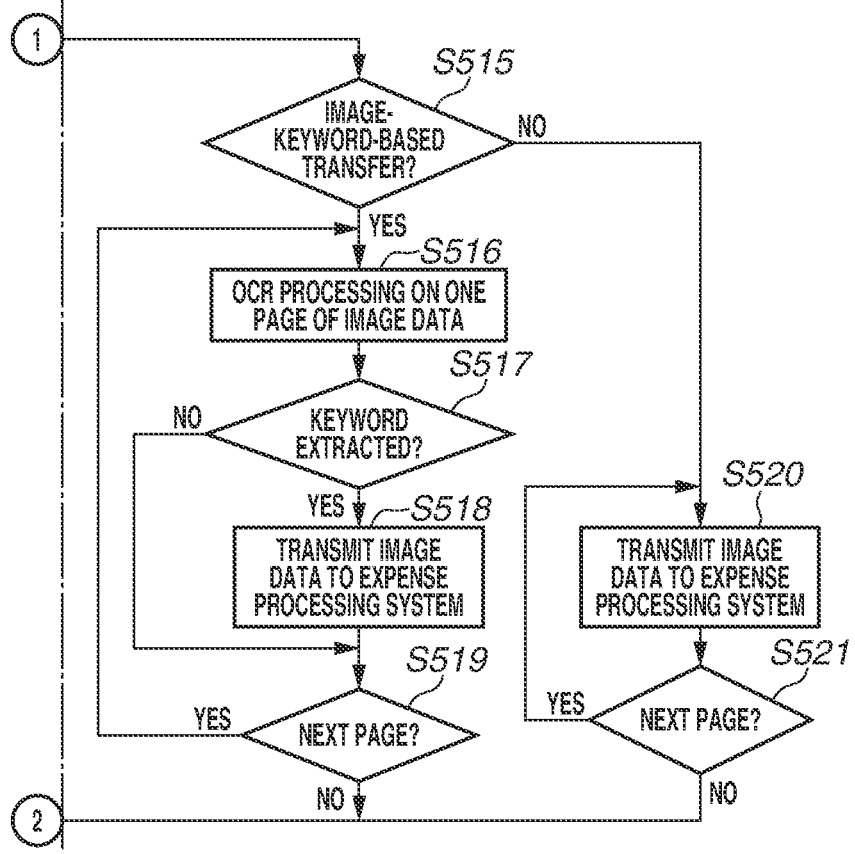

FIGS. 5A and 5B are a flowchart illustrating processing performed when the image forming apparatus 1 registers an expense as a voucher by transferring image data received thereby as an Internet fax to the expense processing system 307.

First, in step S501, the CPU 101 determines whether the image forming apparatus 1 has received an Internet fax image based on the post office protocol (POP) or the simple mail transfer protocol (SMTP). If the CPU 101 receives an Internet fax image (YES in step S501), the processing proceeds to step S502.

In step S502, the CPU 101 acquires a transmission source mail address given by using the communication protocol (POP/SMTP).

In step S503, the CPU 101 determines whether the acquired transmission source mail address is included in a preset expense processing system transfer list. If the CPU 101 determines that the transmission source mail address is included in the expense processing system transfer list (YES in step S503), the processing proceeds to step S505. Otherwise (NO in step S503), the processing proceeds to step S504.

In step S504, the CPU 101 prints out the received image and ends the present processing. If the image forming apparatus 1 has received a plurality of pages, the CPU 101 prints out all the pages.

In step S505, the CPU 101 determines whether page-based transfer is set as a detailed transfer condition with respect to the expense processing system 307. If the CPU 101 determines that the page-based transfer is set (YES in step S505), the processing proceeds to step S506. Otherwise (NO in step S505), the processing proceeds to step S510.

In step S506, the CPU 101 determines whether the image forming apparatus 1 has received the page corresponding to the page number set by the user as the page to be transferred based on the page-based transfer. If the CPU 101 determines that the image forming apparatus 1 has received the specified page (YES in step S506), the processing proceeds to step S507. Otherwise (NO in step S506), the processing proceeds to step S508.

In step S507, the CPU 101 transmits one page of the image data to the expense processing system 307 and requests the expense processing system 307 to register the image data as expense data.

In step S508, the CPU 101 notifies a preset notification destination of the result of the transfer to the expense processing system 307.

In step S509, the CPU 101 determines whether image printing is set as a currently applied transfer condition. If the image printing is set (YES in step S509), the processing proceeds to step S504, and the CPU 101 prints out the received image and ends the present processing. If the image printing is not set (NO in step S509), the CPU 101 ends the processing without printing out the received image.

In step S510, the CPU 101 determines whether title-keyword-based transfer is set as a detailed transfer condition with respect to the expense processing system 307. In a case where the title-keyword-based transfer is set, the transfer is performed only when the title of the received Internet fax includes the keyword specified by the user. If the title-keyword-based transfer is specified (YES in step S510), the processing proceeds to step S511. Otherwise (NO in step S510), the processing proceeds to step S515.

In step S511, the CPU 101 acquires title character string data given by using the communication protocol (POP/SMTP).

In step S512, the CPU 101 determines whether the title keyword set as a detailed transfer condition has been extracted from the title character string data acquired in step S511. If the CPU 101 determines that the title keyword has been extracted (YES in step S512), the processing proceeds to step S513. Otherwise (NO in step S512), the processing proceeds to step S508.

In step S513, the CPU 101 transmits one page of image data to the expense processing system 307 and requests the expense processing system 307 to register the image data as expense data.

In step S514, the CPU 101 determines whether the received image data has the next page. If the CPU 101 determines that the received image data has the next page (YES in step S514), the processing returns to step S513, and the CPU 101 performs steps S513 and S514 again. Otherwise (NO in step S514), the processing proceeds to step S508.

In step S515, the CPU 101 determines whether image-keyword-based transfer is set as a detailed transfer condition with respect to the expense processing system 307. In a case where the image-keyword-based transfer is set, the transfer is performed only when the keyword specified by the user has been extracted from the received Internet fax image. If the image-keyword-based transfer is specified (YES in step S515), the processing proceeds to step S516. Otherwise (NO in step S515), the processing proceeds to step S520.

In step S516, the CPU 101 performs OCR processing on one page of image data.

In step S517, the CPU 101 determines whether the keyword set as a detailed transfer condition has been extracted from the result of the OCR processing performed in step S516. If the keyword has been extracted (YES in step S517), the processing proceeds to step S518. Otherwise (NO in step S517), the processing proceeds to step S519.

In step S518, the CPU 101 transmits the image data of the page, from which the keyword has been extracted, to the expense processing system 307 and requests the expense processing system 307 to register the image data as expense data.

In step S519, the CPU 101 determines whether received image data has the next page. If the received image data has the next page (YES in step S519), the processing returns to step S516, and the CPU 101 performs steps S516 to S518 again. Otherwise (NO in step S519), the processing proceeds to step S508.

In step S520, the CPU 101 transmits one page of image data to the expense processing system 307 and requests the expense processing system 307 to register the image data as expense data.

In step S521, the CPU 101 determines whether the received image data has the next page. If the received image data has the next page (YES in step S521), the processing returns to step S520, and the CPU 101 processes the next page of image data in the same way. Otherwise (NO in step S521), the processing proceeds to step S508.

Figure 6B:
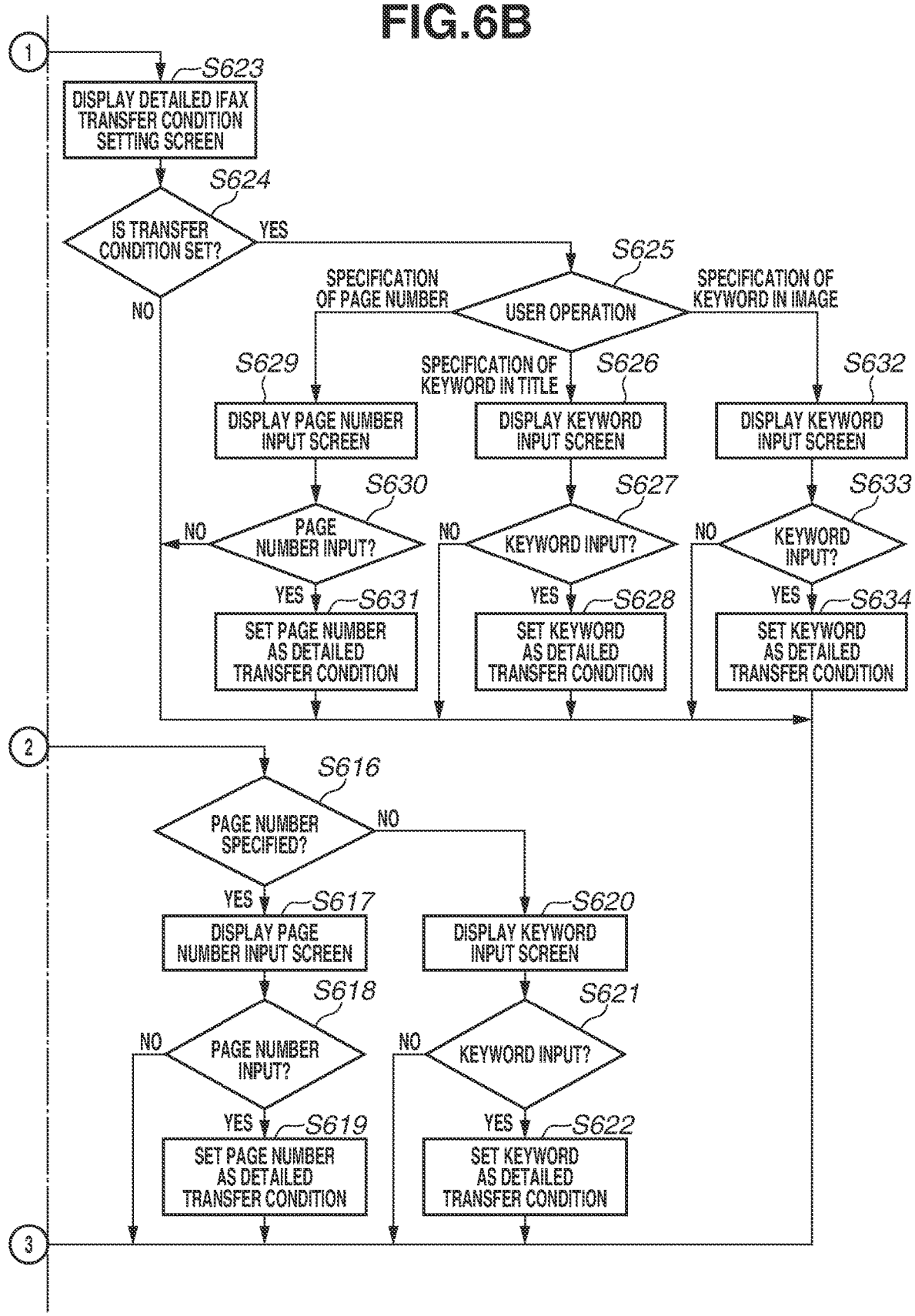

FIGS. 6A and 6B are a flowchart illustrating a procedure of creating an expense processing system transfer list in the image forming apparatus 1.

In step S601, the CPU 101 displays a reception and transfer setting screen as illustrated in FIG. 7. By pressing a button displayed on the screen, the user can register, edit, or remove an entry in the expense processing system transfer list. In addition, a list 704 as the expense processing system transfer list registered by the user is displayed on the screen. In step S635, if the user presses a close button 705 on the screen in FIG. 7 (YES in step S635), the CPU 101 ends the present processing. If the user presses a button other than the close button 705 (NO in step S635), the processing proceeds to step S602.

Figure 8:
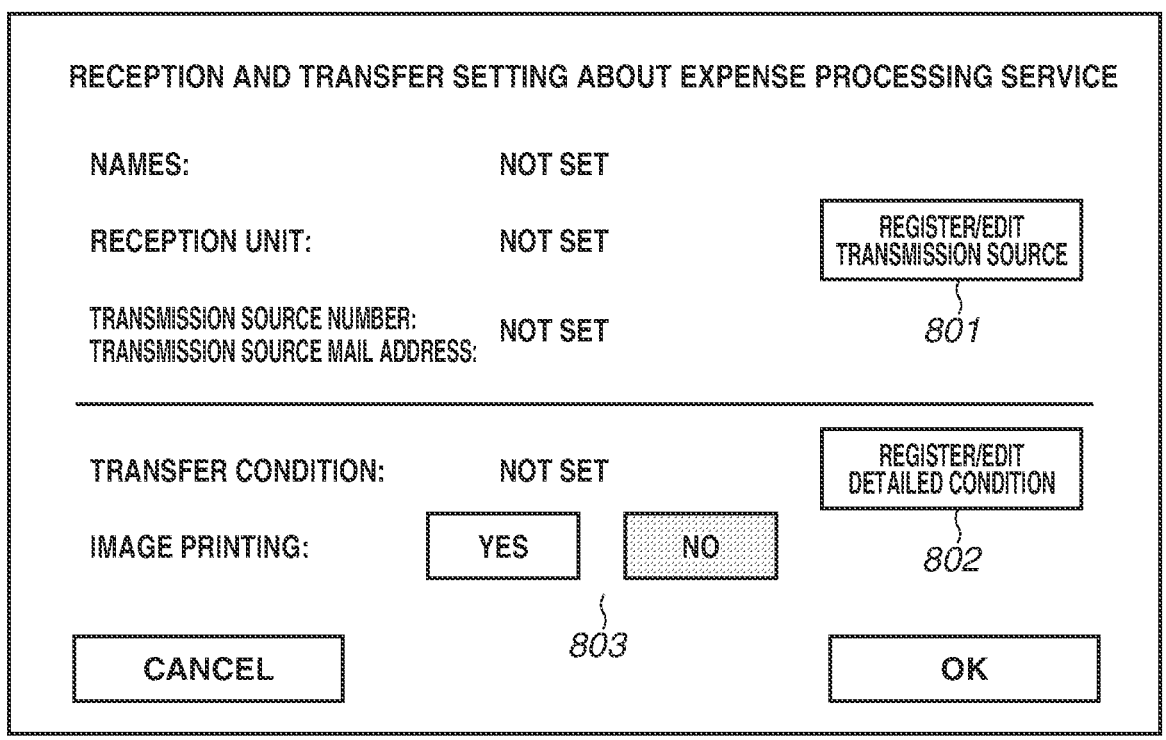
FIG. 8 illustrates a new transfer setting registration screen of the image forming apparatus in the cooperation system.

In step S602, the CPU 101 determines which button other than the close button 705 has been pressed by the user on the reception and transfer setting screen in FIG. 7. If the user presses a register button 701 (REGISTER in step S602), the processing proceeds to step S603, and the CPU 101 displays a new transfer setting registration screen as illustrated in FIG. 8. If the user selects an entry from the list 704 as the expense processing system transfer list and presses an edit button 702 on the screen in FIG. 7 (EDIT in step S602), the processing proceeds to step S604, and the CPU 101 displays a reception and transfer setting edit screen as illustrated in FIG. 11. If the user selects an entry from the list 704 as the expense processing system transfer list and presses a remove button 703 on the screen in FIG. 7 (REMOVE in step S602), the processing proceeds to step S605, and the CPU 101 removes the selected entry.

Figure 9:
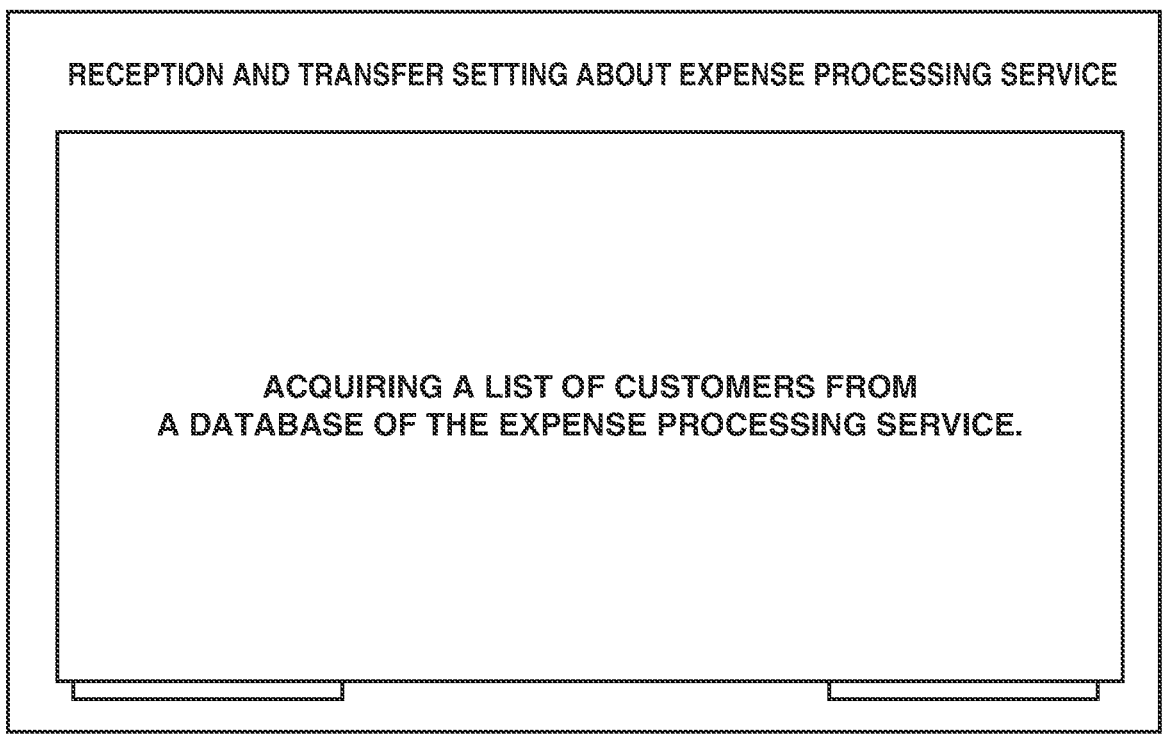
FIG. 9 illustrates a customer list acquisition screen of the image forming apparatus in the cooperation system.

In step S606, the CPU 101 receives a user operation on the new transfer setting registration screen in FIG. 8. If the user presses a transmission source registration/edit button 801 (REGISTER/EDIT TRANSMISSION SOURCE in step S606), the processing proceeds to step S607, and the CPU 101 displays a customer list acquisition screen as illustrated in FIG. 9. In step S608, the CPU 101 requests the expense processing system 307 to acquire customer list information.

In step S609, the CPU 101 displays a customer list acquired from the expense processing system 307 on a customer selection screen illustrated in FIG. 10.

In step S610, the CPU 101 receives a user operation on the customer selection screen in FIG. 10. If the user selects any customer information and presses an OK button 1001 (YES in step S610), the processing proceeds to step S611, and the CPU 101 sets the selected customer information as a transfer condition, and the processing proceeds to step S604. In step S610, if the user presses a cancel button 1002 (NO in step S610), the processing returns to step S603, and the CPU 101 displays the new transfer setting registration screen.

In step S604, the CPU 101 displays the reception and transfer setting edit screen illustrated in FIG. 11. In step S606, the CPU 101 receives a user operation. The reception and transfer setting edit screen in FIG. 11 differs from the new transfer setting registration screen in FIG. 8 in that the customer information selected by the user from the above steps S603 to S611 is set as a transfer condition.

In step S606, if the user presses a detailed condition registration/edit button 802 (REGISTER/EDIT DETAILED CONDITION in step S606), the processing proceeds to step S613, and the CPU 101 starts to perform a detailed condition registration/edit procedure. In contrast, in step S606, if the user presses either button 803, which indicates execution or inexecution of image printing, the processing proceeds to step S612, and the CPU 101 switches the print setting applied when the transfer is performed.

In step S613, the CPU 101 checks the reception unit set as a transfer condition. If the reception unit set as a transfer condition is FAX (YES in step S613), the processing proceeds to step S614. If the reception unit is IFAX (NO in step S613), the processing proceeds to step S623.

Figure 12:
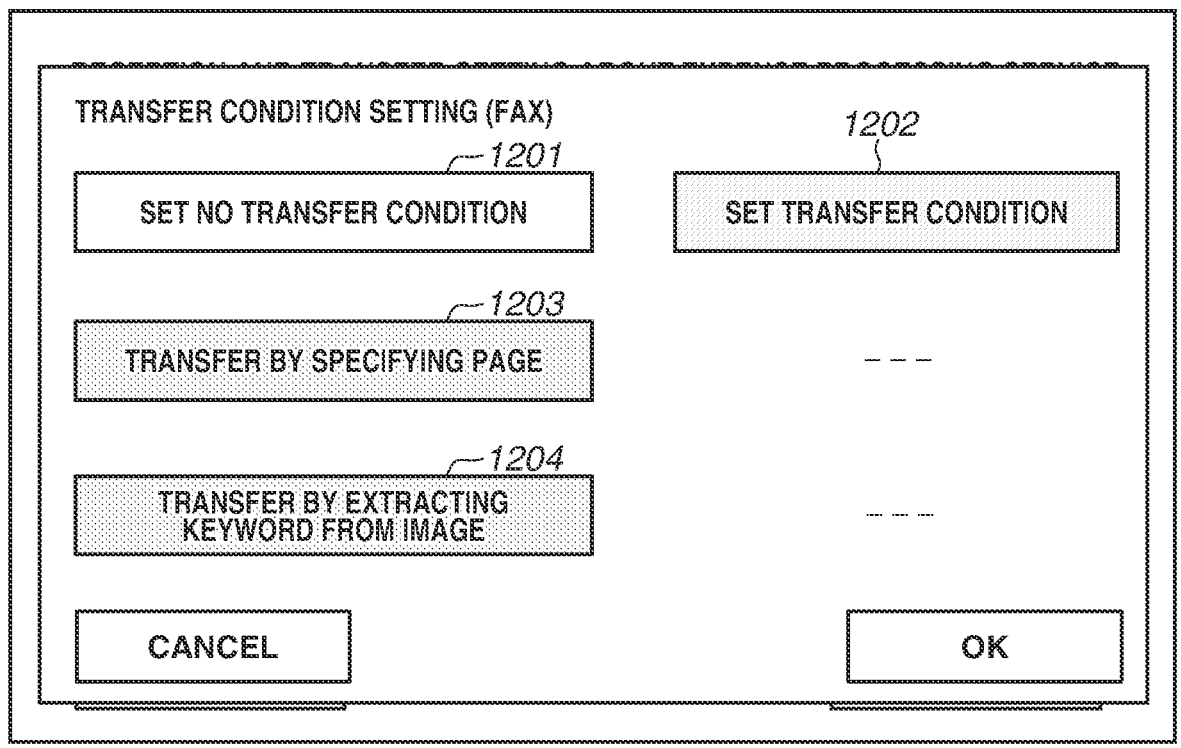
FIG. 12 illustrates a detailed fax transfer condition setting screen of the image forming apparatus in the cooperation system.

In step S614, the CPU 101 displays a detailed FAX transfer condition setting screen as illustrated in FIG. 12. In this step S614, the user determines whether to set a transfer condition as a detailed transfer condition. If the user wishes to set a transfer condition (YES in step S615), the user can select the transfer by specifying a page number or the transfer by extracting a keyword from an image.

In step S615, the CPU 101 determines whether the user has set a transfer condition on the detailed FAX transfer condition setting screen illustrated in FIG. 12. If the user presses a button 1201 indicating "SET NO TRANSFER CONDITION" (NO in step S615), the processing returns to step S604, and the CPU 101 displays the reception and transfer setting edit screen.

In step S615, if the user presses a button 1202 indicating "SET TRANSFER CONDITION", the processing proceeds to step S616, and the CPU 101 receives a user instruction about selection of a transfer condition.

In step S616, if the user specifies a page number and presses a transfer button 1203 (YES in step S616), the processing proceeds to step S617, and the CPU 101 displays a page number input screen. As this page number input screen, the CPU 101 displays a software keyboard screen illustrated in FIG. 14. In step S618, the CPU 101 receives input of a page number from the user.

In step S618, if the user inputs a page number and presses an OK button 1401 (YES in step S618), the processing proceeds to step S619, and the CPU 101 sets the page number as a detailed transfer condition. Next, the processing returns to step S604, and the CPU 101 displays the reception and transfer setting edit screen.

Figure 14:
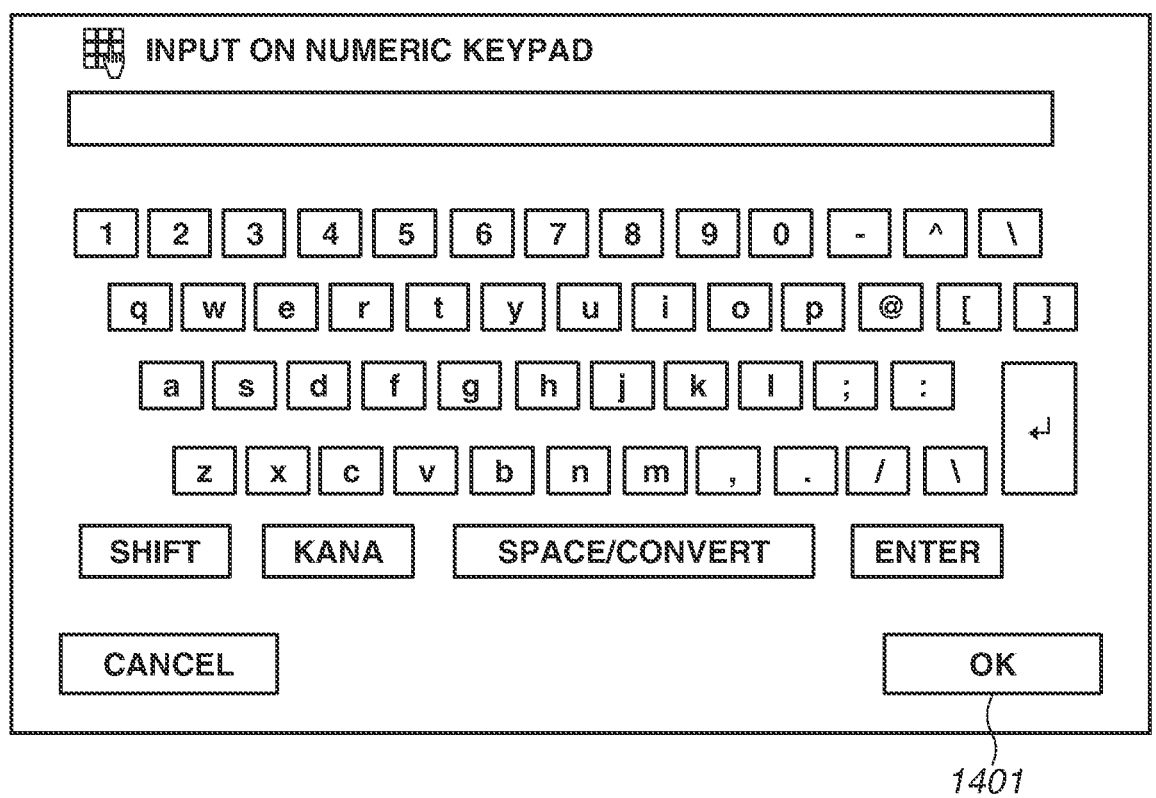
FIG. 14 illustrates a software keyboard screen of the image forming apparatus.

In step S616, if the user presses a button 1204 indicating the transfer by extracting a keyword from an image (NO in step S616), the processing proceeds to step S620, and the CPU 101 displays a keyword input screen. As this keyword input screen, the CPU 101 displays the software keyboard screen as illustrated in FIG. 14 as in step S617 and receives input of a keyword from the user.

In step S621, if the user inputs a keyword and presses the OK button 1401 (YES in step S621), the processing proceeds to step S622, and the CPU 101 sets the keyword as a detailed transfer condition. Next, the processing returns to step S604, and the CPU 101 displays the reception and transfer setting edit screen.

Figure 13:
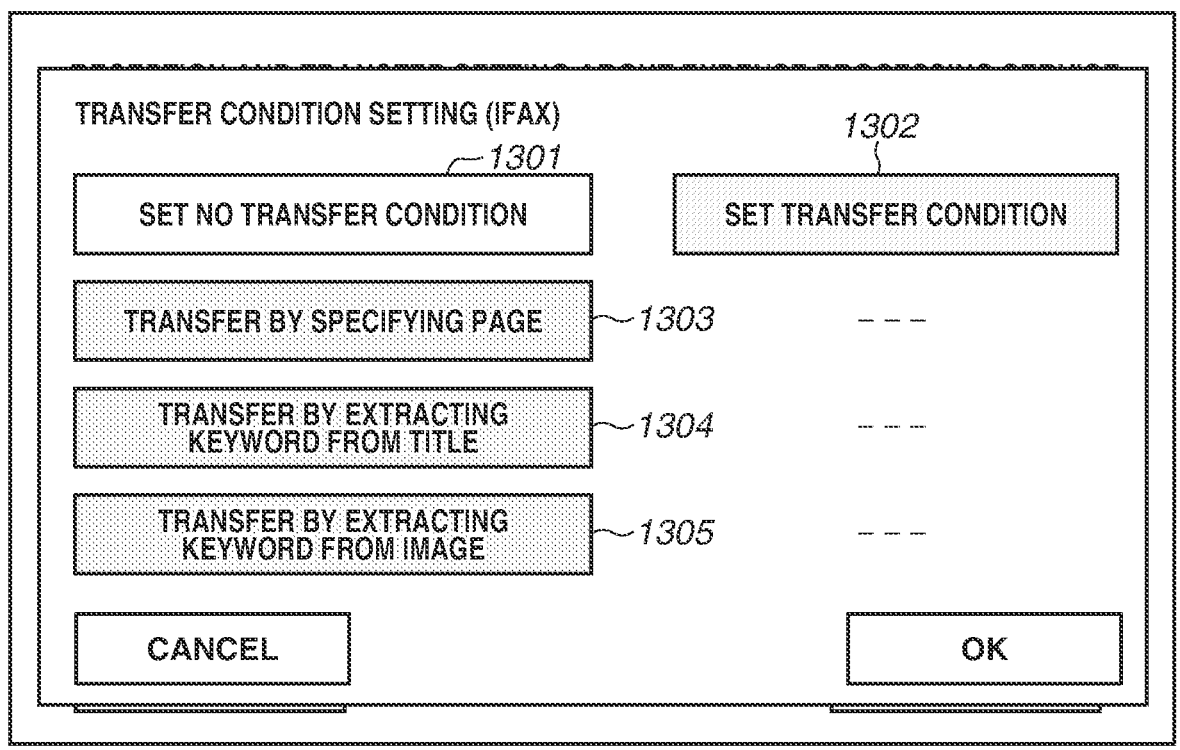
FIG. 13 illustrates a detailed Ifax transfer condition setting screen of the image forming apparatus in the cooperation system.

In step S623, the CPU 101 displays a detailed IFAX transfer condition setting screen as illustrated in FIG. 13. In this step S623, the user determines whether to set a transfer condition as a detailed transfer condition. If the user sets a transfer condition (YES in step S624), the user can select the transfer by specifying a page number, the transfer by extracting a keyword from the title, or the transfer by extracting a keyword from an image.

In step S624, the CPU 101 determines whether the user has set a transfer condition on the detailed IFAX transfer condition setting screen illustrated in FIG. 13. If the user presses a button 1301 indicating "SET NO TRANSFER CONDITION" (NO in step S624), the processing returns to step S604, and the CPU 101 displays the reception and transfer setting edit screen.

In step S624, if the user presses a button 1302 indicating "SET TRANSFER CONDITION" (YES in step S624), the processing proceeds to step S625, and the CPU 101 receives a user instruction about selection of a transfer condition.

In step S625, if the user presses a button 1303 indicating the transfer by specifying a page number (SPECIFICATION OF PAGE NUMBER in step S625), the processing proceeds to step S629, and the CPU 101 displays a page number input screen. As this page number input screen, the CPU 101 displays the software keyboard screen as illustrated in FIG. 14 and receives input of a page number from the user in step S630.

In step S630, if the user inputs a page number and presses the OK button 1401 (YES in step S630), the processing proceeds to step S631, and the CPU 101 sets the page number as a detailed transfer condition. Next, the processing returns to step S604, and the CPU 101 displays the reception and transfer setting edit screen.

In step S625, if the user presses a button 1304 indicating the transfer by extracting a keyword from the title (SPECIFICATION OF KEYWORD IN TITLE in step S625), the processing proceeds to step S626, and the CPU 101 displays a keyword input screen. As this keyword input screen, the CPU 101 displays the software keyboard screen illustrated in FIG. 14 as in step S629 and receives input of a keyword from the user.

In step S627, if the user inputs a keyword and presses the OK button 1401 (YES in step S627), the processing proceeds to step S628, and the CPU 101 sets the keyword extracted from the title as a detailed transfer condition. Next, the processing returns to step S604, and the CPU 101 displays the reception and transfer setting edit screen.

In step S625, if the user presses a button 1305 indicating the transfer by extracting a keyword from an image (SPECIFICATION OF KEYWORD IN IMAGE in step S625), the processing proceeds to step S632, and the CPU 101 displays a keyword input screen. As this keyword input screen, the CPU 101 displays the software keyboard screen illustrated in FIG. 14 as in steps S626 and S629 and receives input of a keyword from the user.

In step S633, if the user inputs a keyword and presses the OK button 1401 (YES in step S633), the processing proceeds to step S634, and the CPU 101 sets the keyword extracted from the title as a detailed transfer condition. Next, the processing returns to step S604, and the CPU 101 displays the reception and transfer setting edit screen.

Through the above procedure, the image forming apparatus 1 can register a received image in the expense processing system as voucher data without printing and scanning the received image again.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-188939, filed Nov. 12, 2020, which is hereby incorporated by reference herein in its entirety.

What is claimed is:

1. An image processing apparatus that communicates with a server processing an expense, the image processing apparatus comprising:
   one or more communicators configured to receive image data used in the expense, and
   a controller configured to control the one or more communicators and to acquire transmission source information associated with the image data;
   wherein in a case where the transmission source information is included in a preset list the controller determines whether a transfer condition is met, and
   wherein in a case where the transfer condition is met, the one or more communicators transmit the received image data to the server and request the server to register the image data as data for the expense.

2. The image processing apparatus according to claim 1, wherein in a case where the transfer condition is based on a keyword, the controller executes character recognition processing on the received image data,
   wherein, in a case where a character string obtained as a result of the execution of the character recognition processing does not include the keyword, the one or more communicators do not transmit the received image data to the server.

3. The image processing apparatus according to claim 1, wherein, in a case where the transmission source information is not included in the preset list, the one or more communicators do not transmit the received image data to the server.

4. The image processing apparatus according to claim 1, wherein the transmission source information is a FAX number of a transmission source.

5. The image processing apparatus according to claim 1, wherein the transmission source information is an e-mail address of a transmission source.

6. The image processing apparatus according to claim 1,
   wherein the one or more communicators receive the image data attached to e-mail,
   wherein, in a case where a title of the e-mail is not a predetermined title, the one or more communicators do not transmit the received image data to the server, and
   wherein, in a case where the title of the e-mail is the predetermined title, the communicator transmits the received image data to the server.

7. The image processing apparatus according to claim 1,
   wherein the server is a server providing expense processing system,
   wherein the one or more communicators receive a plurality of pieces of transmission source information used in the expense processing system from the server,
   wherein the controller receives selection of the transmission source information from the received plurality of pieces of transmission source information, and
   wherein the controller registers the input character string in association with the selected transmission source information.

8. The image processing apparatus according to claim 1,
   wherein in a case where the transfer condition is based on a page and the received image data does not correspond to a preset page number, the one or more communicators do not transmit the received image data to the server.

9. The image processing apparatus according to claim 1,
   wherein the image data is a fax image from a fax communication protocol or an Internet fax image.

10. An image processing method for communicating with a server processing an expense, the method comprising:
    receiving image data used in the expense;
    acquiring transmission source information associated with the received image data;
    determining whether a transfer condition is met in a case where the transmission source information is included in a preset list; and
    transmitting the received image data to the server and requesting the server to register the image data as data for the expense in a case where the transfer condition is met.

11. A non-transitory computer-readable storage medium storing a program that, when executed by a computer, causes the computer to perform a method for communicating with a server processing an expense, the method comprising:
    receiving image data used in the expense;
    acquiring transmission source information associated with the received image data;
    determining whether a transfer condition is met in a case where the transmission source information is included in a preset list; and
    transmitting the received image data to the server and requesting the server to register the image data as data for the expense in a case where the transfer condition is met.

* * * * *